United States Patent
Aggarwal et al.

(10) Patent No.: US 11,295,495 B2
(45) Date of Patent: Apr. 5, 2022

(54) AUTOMATIC POSITIONING OF TEXTUAL CONTENT WITHIN DIGITAL IMAGES

(71) Applicant: Adobe Inc., San Jose, CA (US)

(72) Inventors: Vipul Aggarwal, New Delhi (IN); Neel Kadia, Ahmedabad (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/601,263

(22) Filed: Oct. 14, 2019

(65) Prior Publication Data

US 2021/0110587 A1 Apr. 15, 2021

(51) Int. Cl.
*G06F 40/109* (2020.01)
*G06T 11/60* (2006.01)

(52) U.S. Cl.
CPC ............ *G06T 11/60* (2013.01); *G06F 40/109* (2020.01); *G06T 2200/24* (2013.01)

(58) Field of Classification Search
CPC .... G06T 11/60; G06T 2200/24; G06F 40/109
See application file for complete search history.

(56) References Cited

U.S. PATENT DOCUMENTS

| | | | |
|---|---|---|---|
| 9,830,508 B1 | 11/2017 | Winder et al. | |
| 10,049,477 B1 | 8/2018 | Kokemohr et al. | |
| 10,109,092 B1 * | 10/2018 | Hitchings, Jr. | ......... G06T 11/60 |
| 10,782,852 B1 | 9/2020 | Al Majid et al. | |
| 11,270,485 | 3/2022 | Sharma et al. | |
| 2002/0018239 A1 | 2/2002 | Ahrens | |
| 2002/0073121 A1 | 6/2002 | Sano et al. | |
| 2003/0118234 A1 | 6/2003 | Tanaka et al. | |
| 2005/0012760 A1 | 1/2005 | Yamamoto | |
| 2005/0229111 A1 | 10/2005 | Makela | |
| 2006/0217954 A1 | 9/2006 | Koyama et al. | |
| 2008/0002893 A1 | 1/2008 | Vincent et al. | |
| 2009/0041352 A1 | 2/2009 | Okamoto | |
| 2011/0238768 A1 | 9/2011 | Habets et al. | |
| 2011/0273474 A1 | 11/2011 | Iwayama | |
| 2012/0249734 A1 | 10/2012 | Takayama et al. | |
| 2013/0223740 A1 | 8/2013 | Wang et al. | |
| 2014/0198234 A1 | 7/2014 | Kobayashi et al. | |
| 2015/0370889 A1 | 12/2015 | Chiba | |

(Continued)

OTHER PUBLICATIONS

"Final Office Action", U.S. Appl. No. 16/518,433, filed Mar. 19, 2021, 27 pages.

(Continued)

*Primary Examiner* — Kyle R Stork
(74) *Attorney, Agent, or Firm* — FIG. 1 Patents (57) ABSTRACT

Automatic positioning of textual content within digital images is leveraged in a digital medium environment. Initially, user input is received to add textual content to a digital image. The digital image can then be processed to identify at least one object in the digital image using an image segmentation model. A placement region for the textual content that does not overlap the at least one object can be automatically determined. After the placement region is automatically determined, the digital image can be modified by positioning the textual content within the automatically determined placement region of the digital image. Positioning the textual content may include automatically adjusting the textual content to fit within the placement region, such as by automatically scaling or aligning the textual content.

20 Claims, 8 Drawing Sheets

(56) References Cited

U.S. PATENT DOCUMENTS

| | | |
|---|---|---|
| 2017/0032553 A1* | 2/2017 | O'Donovan .......... G06F 40/103 |
| 2017/0199632 A1 | 7/2017 | Ohmura |
| 2017/0336926 A1 | 11/2017 | Chaudhri et al. |
| 2018/0032481 A1* | 2/2018 | Ishida ................... G06F 3/0485 |
| 2018/0268571 A1 | 9/2018 | Park et al. |
| 2019/0192232 A1 | 6/2019 | Altmann et al. |
| 2021/0027508 A1 | 1/2021 | Sharma et al. |

OTHER PUBLICATIONS

"First Action Interview Office Action", U.S. Appl. No. 16/518,433, filed Feb. 25, 2021, 5 pages.

"Pre-Interview First Office Action", U.S. Appl. No. 16/518,433, filed Nov. 30, 2020, 5 pages.

"Non-Final Office Action", U.S. Appl. No. 16/518,433, filed Jun. 17, 2021, 32 pages.

"Corrected Notice of Allowability", U.S. Appl. No. 16/518,433, filed Feb. 7, 2022, 7 pages.

"Corrected Notice of Allowability", U.S. Appl. No. 16/518,433, filed Dec. 9, 2021, 8 pages.

"Notice of Allowance", U.S. Appl. No. 16/518,433, filed Nov. 24, 2021, 11 pages.

* cited by examiner

AUTOMATIC POSITIONING OF TEXTUAL CONTENT WITHIN DIGITAL IMAGES

BACKGROUND

Content editing systems include a variety of tools that enable modification of vast amounts of digital visual content, such as digital images—an example of which is digital photographs. Users are able to interact with these content editing systems in various ways (e.g., touch functionality, styluses, keyboard and mouse, and so on) to modify digital images. As part of this, many conventional content editing systems allow users to add text to digital images. Text may be added to a digital image, for example, as part of a marketing campaign, or in order to publish a photo with textual content on a social network. However, conventional content editing systems simply display the text at a default position within the digital image, and then require the user to manually adjust the size and placement of the text within the digital image.

SUMMARY

To overcome these problems, automatic positioning of textual content within digital images is leveraged in a digital medium environment. Initially, user input is received to add textual content to a digital image. The digital image can then be processed to identify at least one object in the digital image using an image segmentation model. Along with identifying the at least one object, the image segmentation model can determine a classification label of each identified object that describes the identified object.

A placement region for the textual content that does not overlap the at least one object can be automatically determined. To do so, an object mask (e.g., a binary mask) can be generated based on contours of boundaries of the identified objects within the digital image. The object mask identifies at least one object portion at which the identified object is positioned within the digital image, as well as a non-object portion corresponding to the portions of the digital image which do not include objects. Based on the object mask, candidate placement regions (e.g., boundary boxes) which can be formed in the non-object portions of the digital image can be determined. The candidate placement regions can then be prioritized by generating individual placement scores for each of the determined candidate placement regions based on various text placement factors. A placement region can then be selected from the candidate placement regions based on the placement scores, such as by selecting the placement region with the highest placement score.

After the placement region is automatically determined, the digital image can be modified by positioning the textual content within the automatically determined placement region of the digital image. Positioning the textual content may include automatically adjusting the textual content to fit within the placement region, such as by automatically scaling or aligning the textual content.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Many conventional content editing systems allow users to add text to digital images. However, these conventional content editing systems may initially display the text with a default font size and in a default portion of the digital image, such as in a centered position within the digital image. Doing so often causes the digital image and text to appear cluttered, and the text may obstruct a main subject of the digital image, such as a person or object of the digital image. These conventional content editing systems require additional user input to manually adjust the placement position and/or font size of the text within the digital image. For example, the user may be required to reposition the text from the displayed centered position to various different positions in order to find the best place to position the text on the image so that textual content looks good within the digital image. Along with providing additional input to move the text, the user may be further required to manipulate the text by rescaling or realigning the text until the desired position, font size, and alignment is achieved.

Other conventional systems may require the user to first manually specify a placement position within the digital image, and then provide the textual content to be included at the manually specified placement position. In either scenario, such conventional systems place the burden of positioning, scaling, and aligning textual content on the user, which often requires a significant amount of time and manual effort by the user resulting in user frustration. Moreover, requiring the user to position and scale the textual content can result in less than optimal positioning of the textual content within the digital image causing the entire composition to appear cluttered.

To overcome these problems, automatic positioning of textual content within digital images is described. The described techniques intelligently determine an optimal placement region for textual content within a digital image, and then automatically modify the digital image to generate a composition which includes the textual content positioned within the automatically determined placement region of the digital image. Initially, user input is received to add textual content to a digital image, such as via user input to type text into a user interface or as spoken words that are captured by a microphone and converted into text using text recognition techniques. A user may add textual content to the digital image for a variety of different reasons, such as to generate images with text as part of a marketing campaign, or to post images with text on a social network.

Unlike conventional techniques that position the textual content at a default position within the digital image (e.g., a centered position), the described techniques can automatically determine a placement region for the textual content within the digital image. The placement region can be automatically determined based on a context of the digital image and the textual content. Generally, the placement region is determined based on the image context in order to ensure that the textual content does not obstruct an object of the digital image.

To determine the placement region, the digital image can be processed to identify at least one object in the digital image using an image segmentation model, such as semantic image segmentation model. In some cases, the image segmentation model identifies multiple different objects in the digital image, such as people, animals, buildings, and so forth. Along with identifying the at least one object, the image segmentation model can be configured to determine a classification label of each identified object that describes the object.

Next, a placement region for the textual content that does not overlap the at least one object can be automatically determined. To do so, an object mask (e.g., a binary mask) can be generated based on contours of boundaries of the identified objects within the digital image. The object mask identifies at least one object portion at which the identified object is positioned within the digital image, as well as a non-object portion corresponding to the portions of the digital image which do not include objects. Based on the object mask, candidate placement regions (e.g., boundary boxes) which can be formed in the non-object portions of the digital image can be determined. The candidate placement regions can then be prioritized by generating individual placement scores for each of the determined candidate placement regions based on various text placement factors. A placement region can then be selected from the candidate placement regions based on the placement scores, such as by selecting the placement region with the highest placement score.

The text placement factors are generally chosen to ensure an optimal placement region for the textual content within the digital image. In one or more implementations, the text placement factors include determining which of the identified objects has a highest correlation to the textual content, and then assigning higher scores to candidate placement regions which are closer in proximity to the correlated object. To do so, one or more subjects of the textual content are identified using a natural language processing model. A correlated object of the identified objects in the digital image that has a highest correlation to the textual content is identified by comparing the classification labels of each identified object to the subjects of the textual content. The placement scores are then calculated for each of the candidate placement regions based on a proximity of the respective candidate placement region to the correlated object of the digital image. For example, if digital image includes a girl and a dog, and the textual content includes the word "dog", then candidate object regions which are in close proximity to the dog may be given higher placement scores. However, other text placement factors may also be considered for generation of the placement scores, such as a size of each respective candidate placement region, as well as various other design principles, such as the rule of thirds.

After the placement region is automatically determined, the digital image can be modified by positioning the textual content within the automatically determined placement region of the digital image. Positioning the textual content may include automatically adjusting the textual content to fit within the placement region, such as by automatically scaling or aligning the textual content. The textual content can be scaled, for example, by adjusting the font size or font type of the textual content or adjusting spacing between individual characters of the textual content so that the textual content fills the placement region. The modified digital image can then be output for display by a computing device.

In one or more implementations, the text positioning system enables the user to provide user input to reposition the textual content into different ones of the candidate placement regions. For example, in response to additional user input to move the textual content from the placement region to a different region of the digital image (e.g., drag-and-drop" input), the text positioning system can automatically select a candidate placement region of the candidate placement regions that is closest in proximity to the different region specified by the user input. The digital image is then modified by repositioning the textual content within the selected candidate placement region that is closest in proximity to the different region. In this way, the text positioning system can "snap" the textual content to different candidate placement region in response to user input. Doing so makes it easy for the user to reposition and scale the textual content at different regions of the digital image.

The described system and techniques automatically improve the visual balance of compositions that include textual content within a digital image by automatically scaling and positioning textual content in a non-salient portion of a digital image. Moreover, the described techniques, greatly reduce the number of steps that conventional systems require the user to manually perform in order to position, align, and scale textual content within digital images.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

Figure 1:
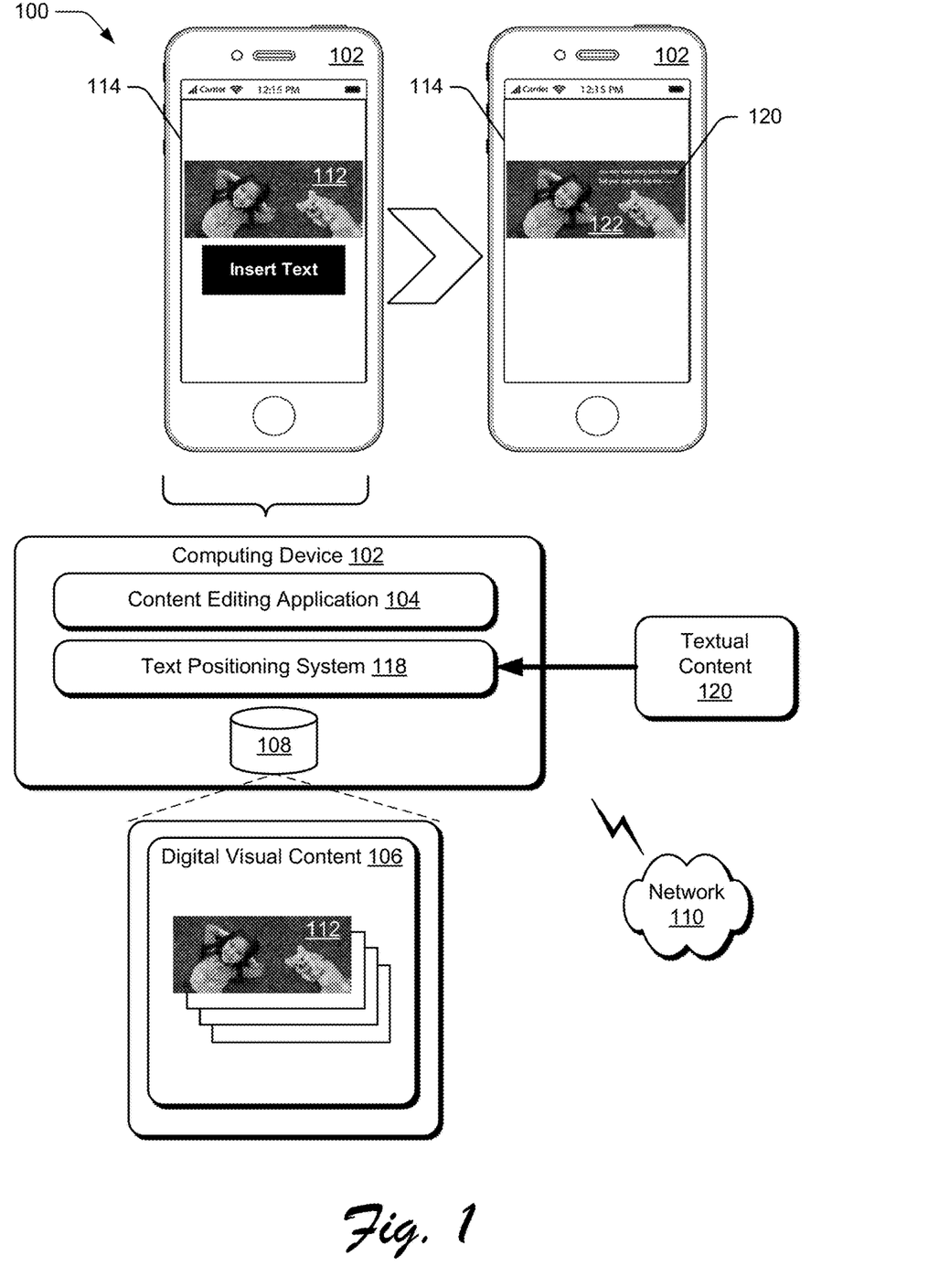
FIG. 1 is an illustration of an environment in an example implementation that is operable to employ techniques described herein.

FIG. 1 is an illustration of a digital medium environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 6.

The computing device 102 is illustrated as including content editing application 104. The content editing application 104 represents functionality of the computing device 102 to create and/or edit digital content. By way of example, the content editing application 104 includes functionality to create or edit digital visual content, such as digital graphics, digital images, and digital images that include graphics. Examples of digital graphics include, but are not limited to, vector graphics, raster graphics (e.g., digital photographs), layouts having different types of graphics, and so forth.

Further, the content editing application 104 may enable a client device user to interact with application interfaces presented via the computing device 102 to perform content editing operations, such as selecting portions of digital content, removing selected portions of the digital content, modifying characteristics (e.g., color, blur, saturation, brightness, and so on) of selected portions of the digital content, selecting options to perform automatic modifications of the digital content, and so forth. The content editing application 104 may facilitate other content editing operations without departing from the spirit or scope of the techniques described herein. The content editing application 104 may further be representative of more than one application (e.g., a suite of applications) that supports functionality to perform content editing operations on various types of digital content without departing from the spirit or scope of the techniques described herein.

At least some of the digital content, relative to which the content editing application 104 is configured to perform operations, is represented by digital visual content 106, which is illustrated as maintained in storage 108 of the computing device 102. Although the digital visual content 106 is illustrated as being maintained in the storage 108, the digital visual content 106 may also represent digital visual content accessible to the computing device 102 in other ways, e.g., accessible to the computing device 102 from storage of another device over network 110 or digital visual content captured by a camera of the computing device 102. The digital visual content 106 may represent various types of digital content without departing from the spirit or scope of the techniques described herein. The digital visual content 106 is depicted with digital image 112, for instance, which is also depicted being displayed via display device 114 of the computing device 102.

In the illustrated environment 100, the computing device 102 is depicted as including a text positioning system 118, the functionality of which may be incorporated in and/or accessible to the content editing application 104. The text positioning system 118 is implemented at least partially in hardware of the computing device 102 to automatically determine a placement region for textual content 120 within the digital visual content 106. The textual content 120 can be obtained by the text positioning system 118 in a variety of different ways. An example of this is to receive user input via a user interface displaying the digital image 112, namely, to add textual content 120 to the digital image 112 by typing the characters of the textual content 120 into an area of the user interface configured to receive text. A user of the computing device 102 may provide input to add textual content 120 to the digital content 106 in other ways without departing from the spirit or scope of the described techniques, such as by writing using a stylus or the user's finger, voice commands, and so forth.

In response to receiving input to add the textual content 120 to the digital image 112, the text positioning system 118 can generate a modified digital image 122 by positioning the textual content 120 at the determined placement region within the digital image "automatically," e.g., without receiving user input to specify a size or position of the textual content 120. Instead, user input is simply received to provide the textual content 120 (e.g., by typing or speaking the words of the textual content 120), and the text positioning system 118 automatically scales and positions the textual content 120 within the digital image 112. In example 100, the display device 114 is depicted displaying the modified digital image 122 with the textual content 120 positioned at the object placement position within the digital image. Although illustrated as implemented locally at the computing device 102, functionality of the illustrated text positioning system 118 may also be implemented in whole or part via functionality available via the network 110, such as part of a web service or "in the cloud."

Having considered an example environment, consider now a discussion of some example details of the techniques for automatic positioning of textual content within digital images in a digital medium environment in accordance with one or more implementations.

Figure 2:
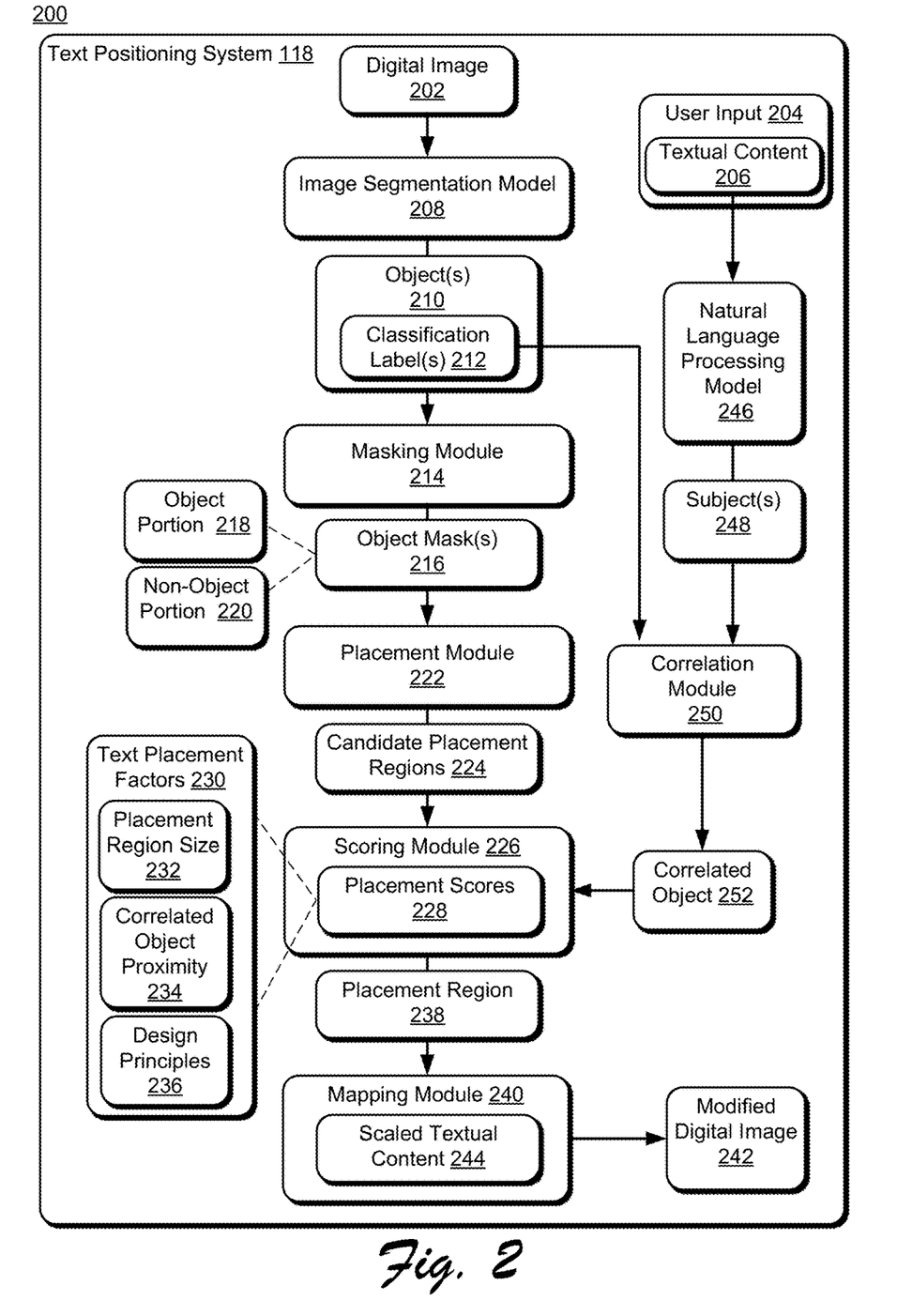
FIG. 2 depicts an example system in which a text positioning system of FIG. 1 automatically positions textual content within a digital image in accordance with the described techniques.

FIG. 2 depicts an example system 200 in which a text positioning system of FIG. 1 automatically positions textual content within a digital image in accordance with the described techniques. The illustrated example 200 includes from FIG. 1 the text positioning system 118. In the illustrated example 200, the text positioning system 118 includes an image segmentation model 208, a masking module 214, a placement module 222, a scoring module 226, a mapping module 240, a natural language processing model 246, and a correlation module 250. Although depicted with these models and modules, in some implementations the text positioning system 118 may include more, fewer, or different models or modules to automatically position textual content within a digital image without departing from the spirit or scope of the techniques described herein.

In the illustrated example 200, the text positioning system 118 is depicted as receiving a digital image 202, such as a digital photograph, a collection of digital photographs, or a digital video. Additionally, the text positioning system 118 obtains user input 204 describing textual content 206 to add to the digital image 202. The content editing application 104 provides tools that enable a user of the computing device 102 to select the digital image 202 and to provide the user input 204 defining the textual content 206. For instance, the content editing application 104 can display the digital image 202 via a user interface of the application for editing and provide a selectable text control that enables the user to provide the user input 204 defining the textual content 206. In this scenario, the user can select the text control and then type in the words of the textual content 206. Alternately or additionally, the content editing application 104 may provide an interface via which a user can provide user input 204 defining the textual content 206 in other ways, such as by receiving spoken commands from a user and using text recognition techniques to determine the textual content 206. As described throughout, while the user input 204 describes the textual content to be included within the digital image 202, the user input 204 does not specify a position to place the textual content 206 within the digital image.

The image segmentation model 208 of the text positioning system 118 represents functionality to identify at least one object 210 in the digital image 202. In some cases, the image segmentation model 208 identifies multiple different objects 210 in the digital image 202, such as people, animals, buildings, and so forth. Along with identifying the at least one object 210, the image segmentation model 208 can be configured to determine a classification label 212 of each identified object 210 that describes the identified object 210.

The image segmentation model 208 be implemented to use one or more known segmentation approaches for identifying objects 210 in digital image 202 and determining classification label 212 for the identified objects. By way of example, these known approaches are configured to partition a digital image into multiple segments by assigning a classification label to every pixel in a digital image such that pixels with the same classification label share certain characteristics. The result of image segmentation is a set of segments that collectively cover the entire digital image, or a set of contours extracted from the image. Each of the pixels in a region are similar with respect to some characteristic or computed property, such as color, intensity, or texture. It is to be appreciated that semantic segmentation is just one example of known object detection approaches which may be utilized by the image segmentation model 208 to identify objects in a digital image, and that generally any type of known object detection approach may be used.

Figure 3:
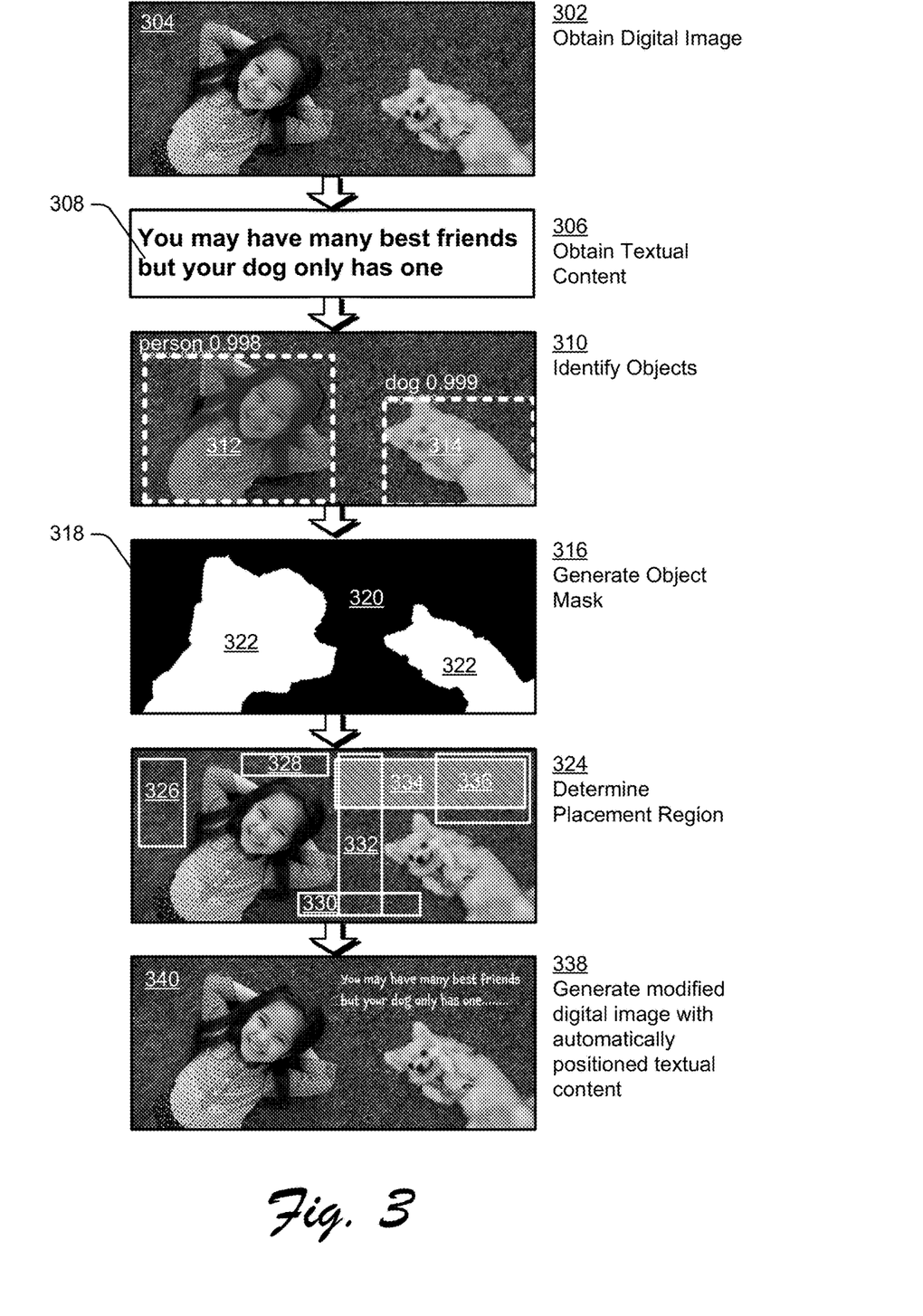
FIG. 3 illustrates an example of automatic placement of textual content within digital images.

As an example, consider FIG. 3 which illustrates an example 300 of automatic placement of textual content within digital images. At 302, a digital image 304 is obtained and at 306 textual content 308 is obtained. The digital image 304 corresponds to an image of a girl and a dog, and the textual content 308 states "You may have many best friends but your dog only has one". At 310, objects 312 and 314 are identified by the image segmentation model 208, corresponding to the girl and the dog, respectively. Along with identifying objects 312 and 314, the image segmentation model 208 has assigned the classification label of "person" to object 312 with 0.998 accuracy and has assigned the classification label of "dog" to object 314 with 0.999 accuracy.

In one or more implementations, the text positioning system 118 can determine an object of the identified objects 210 which has a highest correlation to the textual content 206. To do so, the text positioning system 118 uses a natural language processing model 246 to determine one or more subjects 248 of the textual content 206. Then, the correlation module 250 of the text processing system 118 compares the identified subjects 248 of the textual content 206 to the classification labels 212 of the identified objects 210 in the digital image. Based on this comparison, the text processing system identifies a correlated object 252 which has a highest similarity to the textual content 206. In FIG. 3, for example, the text positioning system 118 can compare the classification labels of the digital image 304, person and dog, to the textual content 308 to identify a high correlation of the textual content to object 314 corresponding to the dog.

Based on contours of boundaries of the identified objects 210, the masking module 214 generates an object mask 216, e.g., a binary mask. In some instances, the masking module 214 generates a separate object mask 216 for each identified object 210. The object mask identifies at least one object portion 218 at which the identified object 210 is positioned within the digital image 202, as well as a non-object portion 220 corresponding to the portions of the digital image 202 which do not include objects 210. In one example, the object mask 216 is generated as a gray-scale image that is the same size as the original digital image 202 and is configured as a 2D array composed of 1's and 0's representative of whether the pixel is part of the object portions 218 or non-object portions 220 of the digital image 202. For example, the object portions 218 of the digital image may be represented in white, while the non-object portions of the digital image may be represented in black. By way of example, at 316 an object mask 318 is generated by the masking module 214 based on the contours of the identified objects 312 and 314 in the digital image 304. The object mask 316 includes a non-object portion 320 depicted in black, and object portions 322 depicted in white for the girl and the dog.

Based on the object mask 216, the placement module 222 determines candidate placement regions 224. The candidate placement regions 224 may correspond to boundary boxes which can be formed in the non-object portions of the digital image. To determine the candidate placement regions 224, the placement module 222 can traverse the object mask 216 to find "boxes" (e.g., rectangles) within the non-object portion 220 of the digital image 202. For example, at 324 the placement module 222 determines the placement region for the textual content by first determining candidate placement regions 326, 328, 330, 332, 334, and 336 within the non-object portion 320 of the object mask 318. In this example, the candidate placement regions 326 correspond to bounding boxes which may be placed in different areas of the non-object portion 320 defined by the object mask 318. In some cases, additional candidate placement regions which are not depicted in FIG. 3 may be identified by the placement module 222.

In one or more implementations, the placement module 222 may discard or ignore candidate placement regions below a minimum size as text placed in too small of a box may be unreadable to the human eye. This minimum size may be predefined or in some case may be configurable by the user. In one or more implementations, the placement module 222 identifies the largest possible rectangles that can be placed in the non-object portion 320 without overlapping or obstructing the identified objects. In some cases, candidate placement regions other than rectangles may be identified by merging two or more candidate placement regions. In this case, the merged candidate placement regions would form a polygon other than a rectangle. In one or more implementations, different shapes can be used for the candidate placement region, such as circles, triangles, pentagons, hexagons, and so forth.

The scoring module 226 of the text positioning system 118 represents functionality to prioritize the candidate placement regions 224 by generating individual placement scores 228 for each of the determined candidate placement regions 224 based on various text placement factors 230. In this example, the text placement factors 230 include a placement region size 232, a correlated object proximity 234, and design principles 236. However, the scoring module 226 can calculate placement scores 228 based on different text placement factors than those depicted and described in relation to the illustrated example without departing from the spirit or scope of the described techniques.

The placement region size 232 corresponds to the total area of the respective candidate placement region 224, and can be calculated using the coordinates of the respective candidate placement region 224 to determine a pixel length and pixel width of the bounding box that defines the boundary of the candidate placement region 224, and calculating the placement region size 232 by multiplying the pixel length by the pixel width of the candidate placement region 224.

The correlated object proximity 234 corresponds to a distance of the respective candidate placement region 224 from the correlated object 252. The correlated object proximity 234, in some cases, can be calculated by determining respective center positions of the respective candidate placement region 224 and the correlated object 252, and then calculating the distance in pixels between the respective center positions. In FIG. 3, for example, candidate placement regions which are in close proximity to the dog may be given higher text placement scores because the dog is highly correlated to the textual content 206.

The scoring module 226 may also factor in various design principles 236 when calculating the placement scores 228. One such design principle is the rule of thirds which divides a digital image into nine equal parts by two equally spaced horizontal lines and two equally spaced vertically lines, and states that important elements should be placed along these lines or their intersections. Thus, in some cases, candidate object placement regions 224 which are located along the vertical or horizontal lines, or their intersections, may be given higher placement scores 228.

In one or more implementations, the scoring module 226 assigns weights to the various text placement factors 230, such as the placement regions size 232, the correlated object proximity 234, and the design principles 236. These weights may be equal, or may be pre-defined, or user defined based on the importance of the different text placement factors 230. The scoring module 226 calculates the placement score 228 for each candidate placement region 224 based on the weighted text placement factors 230. The scoring module 226 can prioritize the candidate placement regions 224 based on the placement scores 228. For example, the candidate placement region 224 with the highest placement score 228 may be placed at the top of a ranked list, while the candidate placement region 224 with a lowest placement score 228 may be placed at the bottom of the ranked list.

A placement region 238 can then be selected, from the candidate placement regions 224, based on the placement scores 228. In one or more implementations, the candidate placement region 224 with the highest placement score 228 is selected. For example, in FIG. 3, the candidate placement region 334 is shown as being selected as the placement region for the textual content based on the various text placement factors. In this example, note that candidate placement region 334 is one of the largest boxes, is in close proximity to object 314 corresponding to the dog which is correlated with the textual content 308, and also satisfies the rule of thirds by being aligned along the top horizontal line of the digital image.

The mapping module 240 represents functionality of the text positioning system 118 to generate a modified digital image 242 by positioning the textual content 206 within the selected placement region 238 of the non-object portion 220 of the digital image 202. For example, the mapping module 240 can map the textual content 206 to the placement region 238 with the highest placement score 228, and then generate the modified digital image 242 to include the textual content 206 within the placement region 238. Thus, the modified digital image 242 output by the text positioning system 118 automatically includes the textual content 206 at the optimal placement position within the digital image. In FIG. 3, for example, at 338, the mapping module 240 outputs a modified digital image 340 which includes the textual content 308 automatically positioned within the selected candidate placement region 334.

As part of positioning the textual content within the digital image, the mapping module 240 may scale the textual content 206. As described throughout, the mapping module 240 can scale the textual content 206 in a variety of different ways, including by adjusting the font size of the textual content (e.g., increasing or decreasing the font size), adjusting a font type of the textual content 206, adjusting the spacing between characters of the textual content (e.g., increasing or decreasing the spacing between characters), or aligning the textual content 206 within the placement region 238.

To do so, the mapping module 240 can calculate a total size of the textual content 206 (e.g., the total length and width of the characters of the textual content in pixels) based on a default font size that is supported by the content editing application 104. The mapping module 240 can then scale the textual content 206 so that the scaled textual content 244 will fill the placement region 238. The mapping module 240 can scale the textual content 206 in a variety of different ways, including by adjusting the font size of the textual content (e.g., increasing or decreasing the font size), adjusting a font type of the textual content 206, adjusting the spacing between characters of the textual content (e.g., increasing or decreasing the spacing between characters), or aligning the textual content 206 to fit within the placement region 238.

In one or more implementations, the mapping module 240 can adjust the font size to a maximum font size that fills the selected placement region 238. This can be accomplished by determining the maximum font size for the textual content that will fit within the selected placement region 238 based on the number of characters within the textual content. Notably, the type of font along with the number of characters and the font size may affect the size of the textual content. Thus, the mapping module 240 can factor in a designated or desired font type when determining the maximum font size for the textual content that will fit within the selected placement region 238. Alternately, the mapping module 240 may utilize an upper and lower limit for the font size to ensure that the font size is not too large or small. As an example, textual content with a font size of 40 may not look good in a digital image. Thus, the upper limit for the font size may be defined to ensure that the textual content is never too large given the size of the digital image. Similarly, a lower limit for the font size may be defined to ensure that textual content is not so small such that the text is unreadable.

In one or more implementations, if the textual content must be scaled to a font size that is below the lower limit in order to fit within the selected placement region 238, the mapping module 240 can automatically combine two or more candidate placement regions 238 that are located adjacent to each other. Doing so increases the size of the placement region so that the textual content can be scaled to a font size that is above the lower limit. In FIG. 3, for example, consider a scenario in which a large amount of textual content is received, and that the textual content will not fit within the selected placement region 334 unless the font size of the textual content is adjusted to a size that is below lower limit. In this scenario, candidate placement regions 334 and 336 could be combined so that the textual content fits within the combined region at a font size that is above the lower limit. Thus, the mapping module 240 can dynamically scale the textual content based on the size of the placement region and the number of characters of the textual content to cause the textual content to fill the selected placement region, while ensuring that the font size is between the upper and lower font size limits.

In one or more implementations, the mapping module 240 may adjust the alignment of the textual content in combination with adjusting the font size. Generally, alignment refers to the alignment of the textual content within the selected placement region, such as left-aligned, center-aligned, right-aligned, or justified. It is to be appreciated, therefore, that adjusting the size of the textual content can be performed to fit the textual content within the selected placement region, while adjusting the alignment improves the aesthetics of the textual content. It is to be appreciated that adjusting the size of the textual content can be performed to fit the textual content within the selected placement region, while adjusting the alignment improves the aesthetics of the textual content.

Figure 4A:
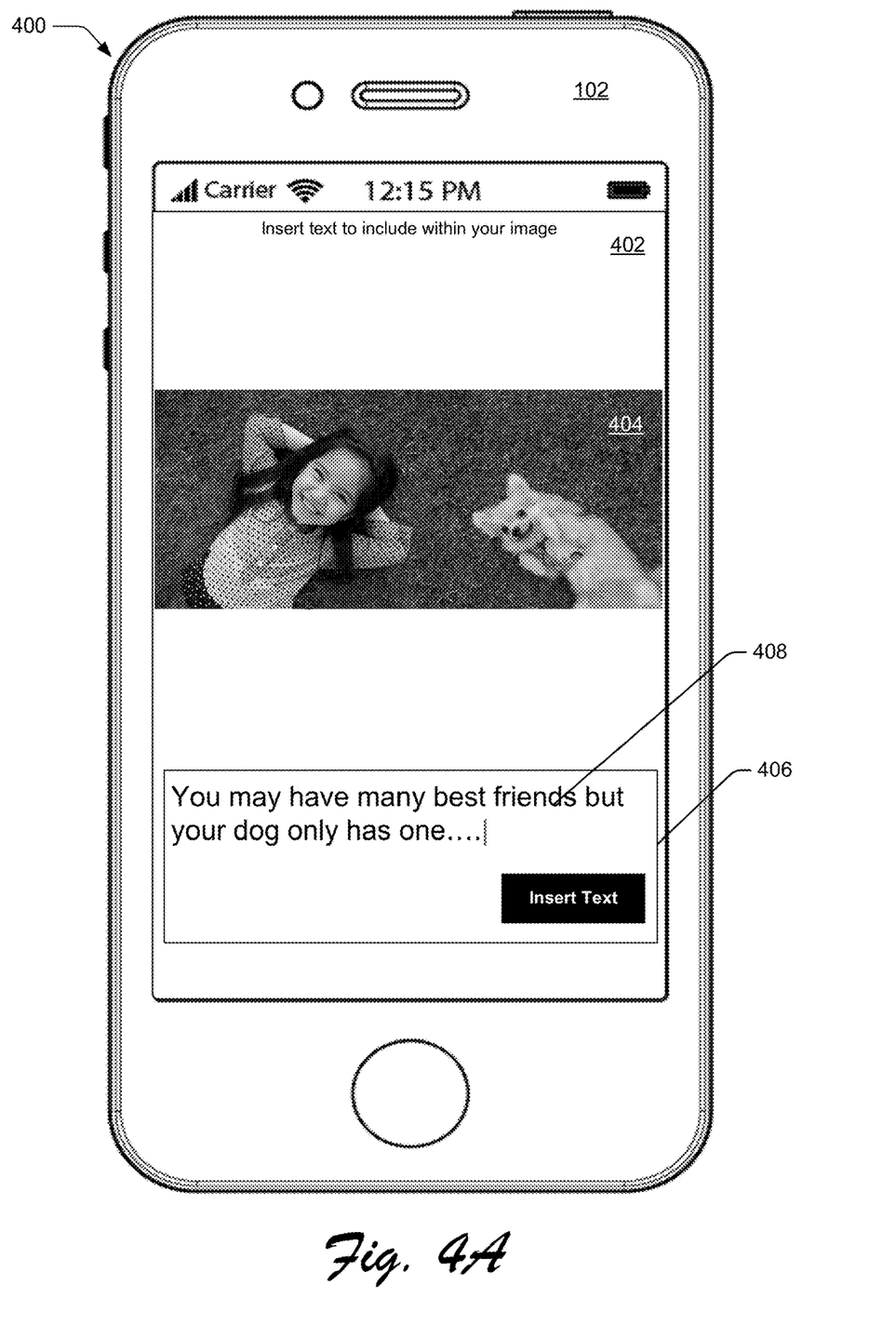
FIGS. 4A-4C depict example user interfaces for automatic placement of textual content within digital images.

FIGS. 4A-4C depict an example 400 in which the text positioning system of FIG. 1 automatically positions textual content within a digital image in accordance with the described techniques. In the illustrated example 400 of FIG. 4A, the computing device 102 is depicted displaying user interface 402, which includes a displayed representation of a digital image 404 and a text control 406. Examples of the functionality of the text control 406 include exposure of a text box and a keyboard to type in the text box, use of a voice-based user interface, and so forth. In this example, a user has typed textual content 408, corresponding to "You may have many best friends but your dog only has one . . . ", into the text control 406. The user can then select the control "insert text" in order to initiate automatic insertion of the textual content 408 into the corresponding digital image 404. It is to be appreciated that the user interface 402 is just one example of a user interface that may be usable to insert textual content into digital images at automatically determined placement regions. Other interfaces, configured in myriad ways, may be surfaced and enable insertion of textual content into digital images in the spirit and scope of the described techniques.

Figure 4B:
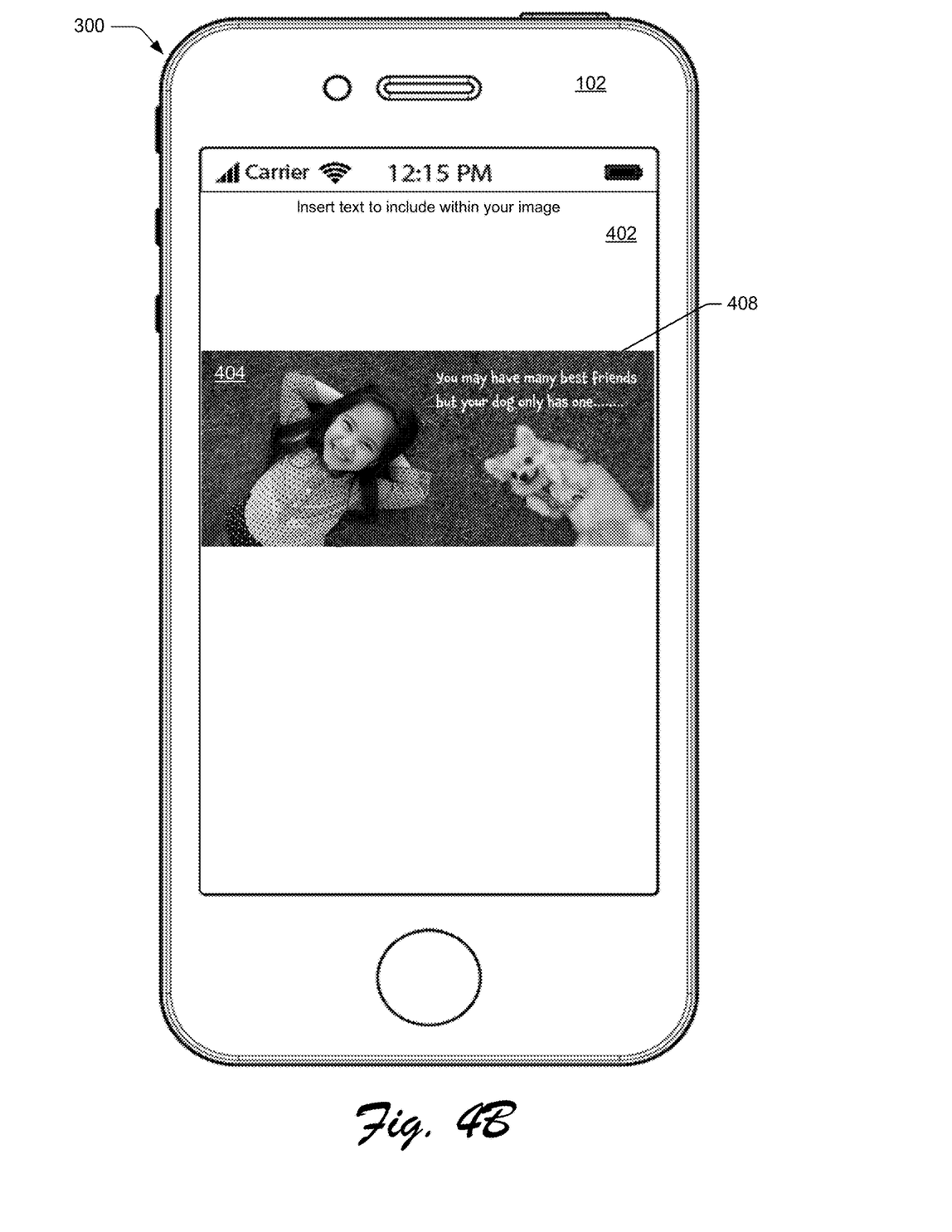

In response to user input to insert the textual content 408 into the digital image 404, such as via selection of the "insert text" control of the text control 406, the text positioning system 118 can automatically determines a placement region within the non-object portion of the digital image as discussed above with regards to FIGS. 2 and 3. Then, the text positioning system 118 can automatically place the textual content 408 into the determined placement region of the digital image 404 as depicted in FIG. 4B.

Figure 4C:
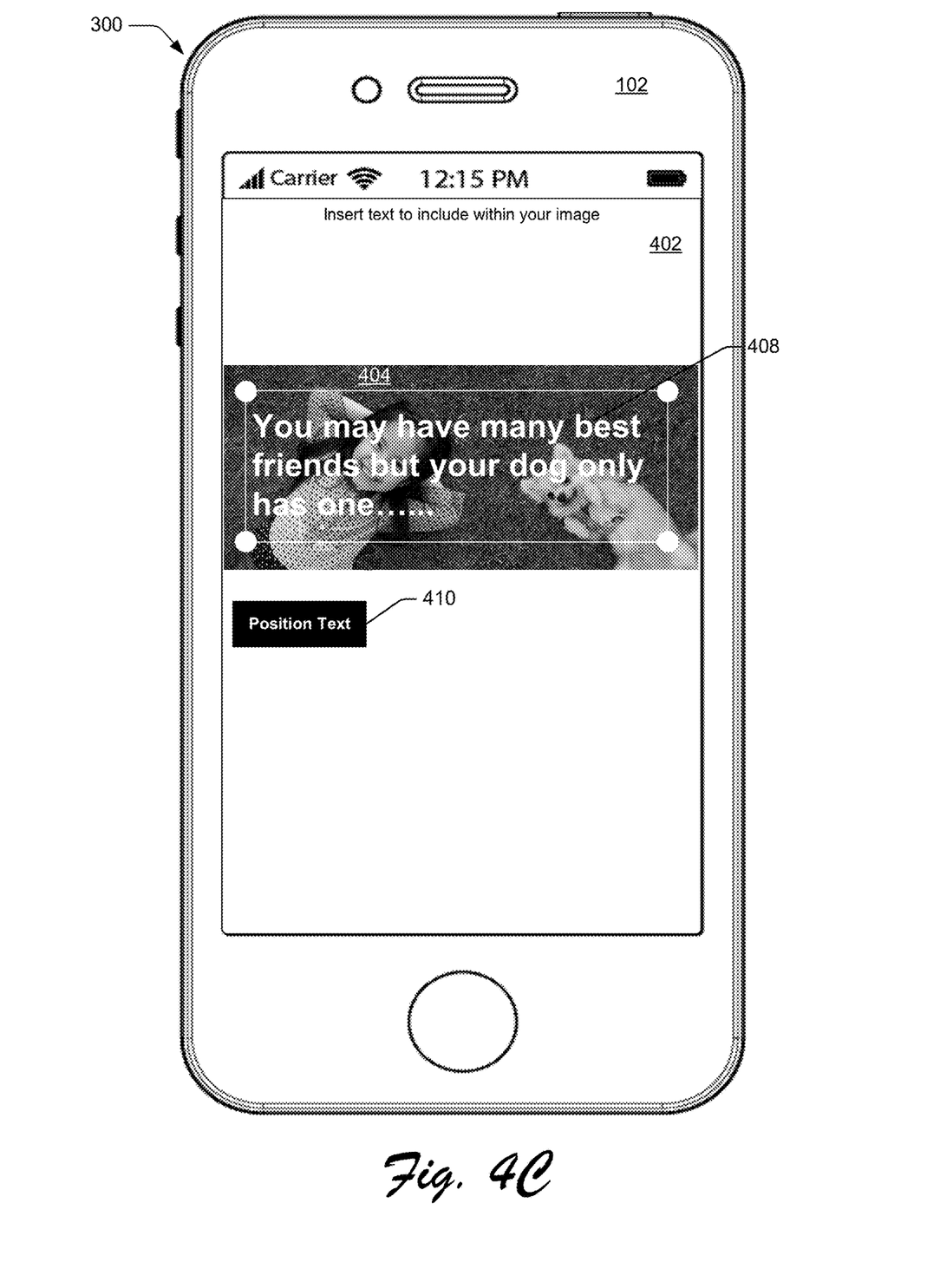

In one or more implementations, the text positioning system 118 can be activated via an additional user input. For example, as depicted in FIG. 4C, the content editing application 104 displays the textual content 408 within the digital image 404 in response to user input to insert the textual content 408 into the digital image 404, such as via selection of the "insert text" control of the text control 406. Notably, in this example, the textual content 408 is positioned in a default position within the digital image, which in this instance corresponds to the center of the digital image 404 and thus overlays and obstructs the objects within the digital image 404, including the correlated object.

However, in this example the user interface 402 includes a text positioning control 410 which can be selected by the user to automatically position the textual content 408 within the digital image 404. For example, in response to selection of the text positioning control 410, the text positioning system 118 is activated to determine the placement region as discussed throughout, and the textual content 408 is then scaled and positioned within the determined placement region within the digital image, as depicted in FIG. 4B.

In one or more implementations, the text positioning control 410 can be selected multiple times in order to reposition the textual content within different placement regions of the digital image. For example, in response to a first user selection of the text positioning control 410, the text positioning system can automatically position the textual content at the placement region shown in FIG. 4B, which has the highest score. If the user is not satisfied with this placement, then the user can select the text positioning control 410 a second time, and in response the text positioning system 118 positions the textual content within a different placement region, such as within the candidate placement region with the next highest placement score 228. The text positioning system, therefore, can enable the user to select the control multiple times, and each time the text is automatically positioned in a different placement region. In this way, the user is able to view multiple different placement regions for the textual content, and then select the placement region which is most visually pleasing to the user.

In one or more implementations, the text positioning system 118 enables the user to provide additional user input to reposition the textual content into different ones of the candidate placement regions. For example, in response to additional user input to move the textual content from the placement region to a different region of the digital image (e.g., drag-and-drop" input), the text positioning system can automatically select a candidate placement region of the candidate placement regions that is closest in proximity to the different region specified by the user input. The digital image is then modified by repositioning the textual content within the selected candidate placement region that is closest in proximity to the different region. In this way, the text positioning system can "snap" the textual content to different candidate placement region in response to user input. Doing so makes it easy for the user to reposition and scale the textual content at different regions of the digital image.

Having discussed example details of the techniques for automatic positioning of textual content within digital images, consider now some example procedures to illustrate additional aspects of the techniques.

Example Procedures

Figure 5:
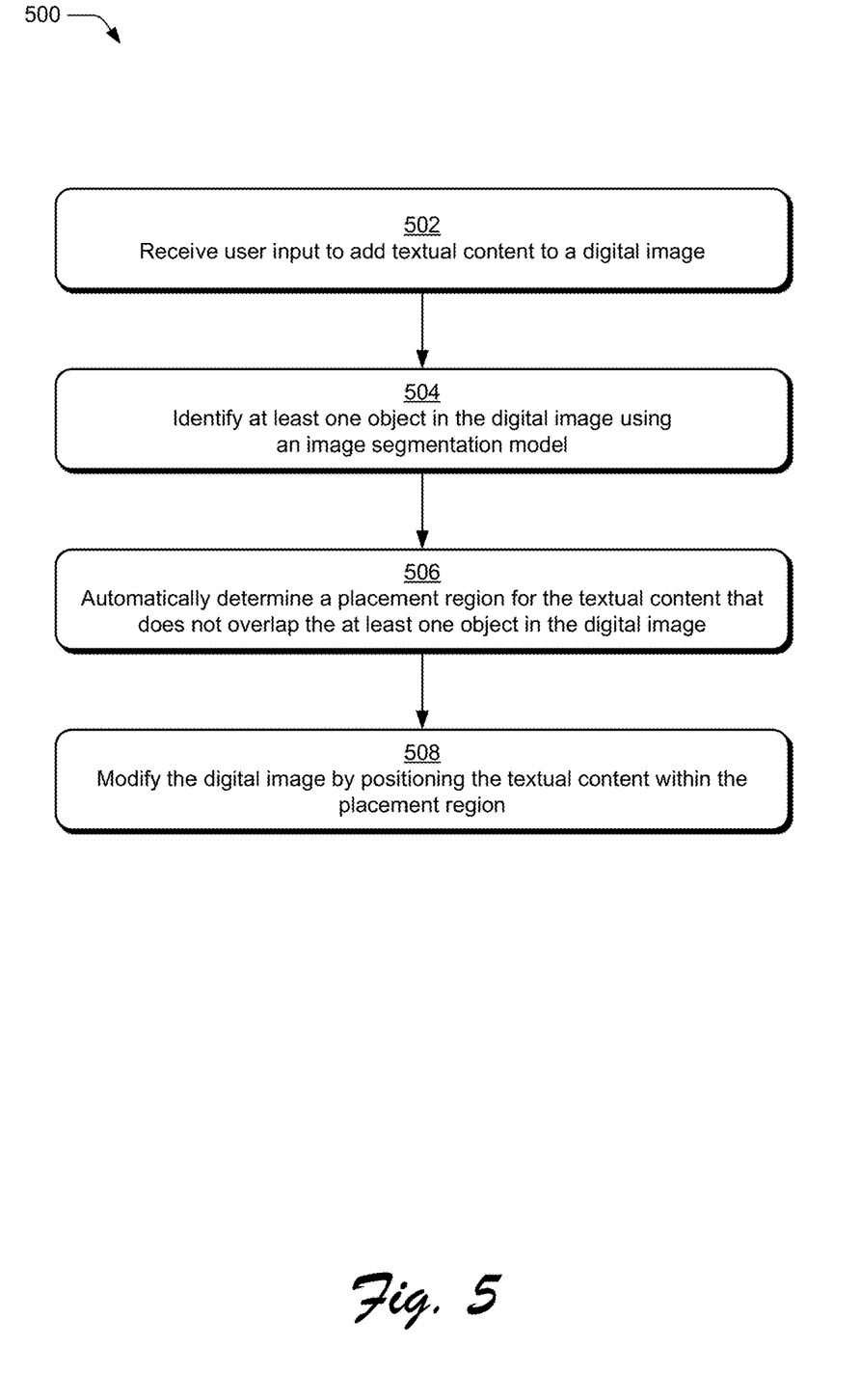
FIG. 5 depicts an example procedure of automatic positioning of textual content within digital images in one or more implementations.

FIG. 5 depicts an example procedure 700 of automatic positioning of textual content within digital images in one or more implementations. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some implementations the procedure is performed by a suitably configured device, such as the computing device 102 of FIG. 1 or the system 200 of FIG. 2.

User input to add textual content to a digital image is received. In accordance with the principles discussed herein, the user input describes the textual content to be included within the digital image but does not specify a position to place the textual content 206 within the digital image. By way of example, text positioning system 118 receives a digital image 202, such as a digital photograph, a collection of digital photographs, or a digital video. Additionally, the text positioning system 118 obtains user input 204 describing textual content 206 to add to the digital image 202. The content editing application 104 provides tools that enable a user of the computing device 102 to select the digital image 202 and to provide the user input 204 defining the textual content 206. For instance, the content editing application 104 can display the digital image 202 via a user interface of the application for editing and provide a selectable text control that enables the user to provide the user input 204 defining the textual content 206. In this scenario, the user can select the text control and then type in the words of the textual content 206. Alternately or additionally, the content editing application 104 may provide an interface via which a user can provide user input 204 defining the textual content 206 in other ways, such as by receiving spoken commands from a user and using text recognition techniques to determine the textual content 206.

At least one object in the digital image is identified using an image segmentation model (block 504). By way of example, the image segmentation model 208 of the text positioning system 118 identifies at least one object 210 in the digital image 202. In some cases, the image segmentation model 208 identifies multiple different objects 210 in the digital image 202, such as people, animals, buildings, and so forth. Along with identifying the at least one object 210, the image segmentation model 208 can be configured to determine a classification label 212 of each identified object 210 that describes the identified object 210.

In one or more implementations, the text positioning system 118 can determine an object of the identified objects 210 which has a highest correlation to the textual content 206. To do so, the text positioning system 118 uses a natural language processing model 246 to determine one or more subjects 248 of the textual content 206. Then, the correlation module 250 of the text processing system 118 compares the identified subjects 248 of the textual content 206 to the classification labels 212 of the identified objects 210 in the digital image. Based on this comparison, the text processing system identifies a correlated object 252 which has a highest similarity to the textual content 206.

The image segmentation model 208 be implemented to use one or more known segmentation approaches for identifying objects 210 in digital image 202 and determining classification label 212 for the identified objects. By way of example, these known approaches are configured to partition a digital image into multiple segments by assigning a classification label to every pixel in a digital image such that pixels with the same classification label share certain characteristics. The result of image segmentation is a set of segments that collectively cover the entire digital image, or a set of contours extracted from the image. Each of the pixels in a region are similar with respect to some characteristic or computed property, such as color, intensity, or texture. It is to be appreciated that semantic segmentation is just one example of known object detection approaches which may be utilized by the image segmentation model 208 to identify objects in a digital image, and that generally any type of known object detection approach may be used.

A placement region for the textual content that does not overlap the at least one object is automatically determined (block 506). By way of example, the masking module 214 generates an object mask 216 (e.g., a binary mask) based on contours of boundaries of the identified objects 210. The object mask 216 identifies at least one object portion 218 at which the identified object 210 is positioned within the digital image 202, as well as a non-object portion 220 corresponding to the portions of the digital image 202 which do not include objects 210. In one example, the object mask 216 is generated as a gray-scale image that is the same size as the original digital image 202 and is configured as a 2D array composed of 1's and 0's representative of whether the pixel is part of the object portions 218 or non-object portions 220 of the digital image 202. For example, the object portions 218 of the digital image may be represented in white, while the non-object portions of the digital image may be represented in black.

Based on the object mask 216, the placement module 222 determines candidate placement regions 224. The candidate placement regions 224 may correspond to boundary boxes which can be formed in the non-object portions of the digital image. To determine the candidate placement regions 224, the placement module 222 can traverse the object mask 216 to find "boxes" (e.g., rectangles) within the non-object portion 220 of the digital image 202. Next, the scoring module 226 of the text positioning system 118 can prioritize the candidate placement regions 224 by generating individual placement scores 228 for each of the determined candidate placement regions 224 based on various text placement factors 230, such as a placement region size 232, a correlated object proximity 234, and design principles 236. A placement region 238 can then be selected, from the candidate placement regions 224, based on the placement scores 228.

The digital image is modified by positioning the textual content within the placement region (block 508). By way of example, the mapping module 240 generates a modified digital image 242 by positioning the textual content 206 within the selected placement region 238 of the non-object portion 220 of the digital image 202. For example, the mapping module 240 can map the textual content 206 to the placement region 238 with the highest placement score 228, and then generate the modified digital image 242 to include the textual content 206 within the placement region 238. Thus, the modified digital image 242 output by the text positioning system 118 automatically includes the textual content 206 at the optimal placement position within the digital image.

As part of positioning the textual content within the digital image, the mapping module 240 may scale the textual content 206. As described throughout, the mapping module 240 can scale the textual content 206 in a variety of different ways, including by adjusting the font size of the textual content (e.g., increasing or decreasing the font size), adjusting a font type of the textual content 206, adjusting the spacing between characters of the textual content (e.g., increasing or decreasing the spacing between characters), or aligning the textual content 206 within the placement region 238.

Having described example procedures in accordance with one or more implementations, consider now an example system and device that can be utilized to implement the various techniques described herein.

Example System and Device

Figure 6:
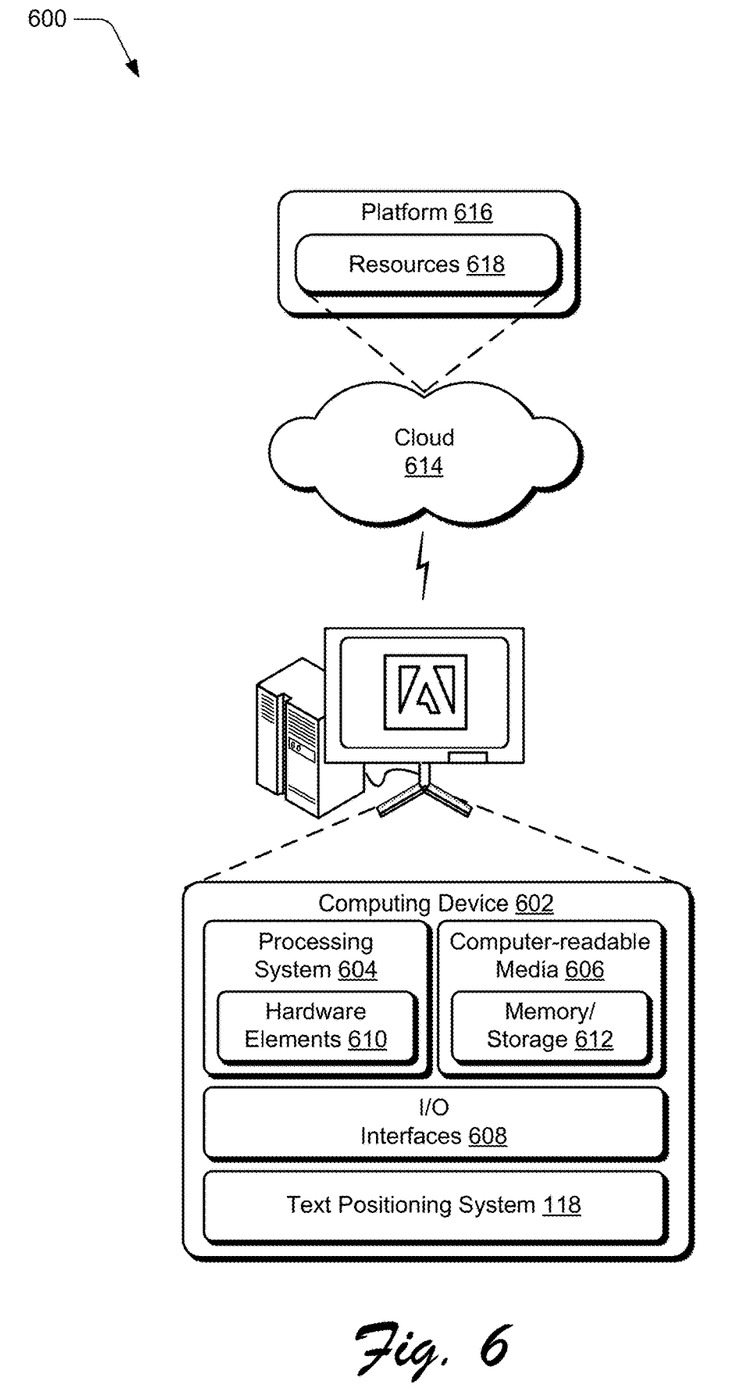
FIG. 6 illustrates an example system including various components of an example device that can be implemented as any type of computing device as described and/or utilized with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the text positioning system 118. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the subject matter has been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. In a digital medium environment, a method for automatically positioning textual content within a digital image, the method comprising:
   receiving, by at least one computing device, user input to add the textual content to the digital image;
   identifying, by the at least one computing device, multiple objects in the digital image using an image segmentation model;
   generating an object mask based on boundaries of the multiple objects in the digital image, the object mask identifying non-object portions corresponding to portions of the digital image which do not include one of the multiple objects;
   determining, by the at least one computing device, multiple candidate placement regions which can be formed in the non-object portions within the digital image;
   identifying one or more subjects of the textual content using a natural language processing model;
   determining, for each of the multiple objects, classification labels of each respective object;
   identifying a correlated object of the multiple objects by comparing the classification label of each respective object to the one or more subjects of the textual content;
   automatically selecting, by the at least one computing device, a placement region for the textual content from the multiple candidate placement regions based at least in part on a proximity of the selected placement regions to the correlated object; and
   modifying, by the at least one computing device, the digital image by positioning the textual content within the selected placement region.

2. The method as described in claim 1, wherein the automatically selecting the placement region for the textual content further comprises:
   calculating a placement score for each of the multiple candidate placement regions; and
   selecting the placement region from the multiple candidate placement regions based on the placement region having a highest calculated placement score of the multiple candidate placement regions.

3. The method as described in claim 2, wherein the placement scores are calculated for each of the multiple candidate placement regions based on a size of the respective candidate placement region.

4. The method as described in claim 2, wherein the placement scores are calculated for each of the multiple candidate placement regions based on a rule of thirds.

5. The method as described in claim 2, wherein the placement scores are calculated for each of the multiple candidate placement regions based on the proximity of the respective candidate placement region to the correlated object of the digital image.

6. The method as described in claim 2, further comprising:
   receiving additional user input to move the textual content from the placement region to a different region of the digital image;
   selecting a candidate placement region of the multiple candidate placement regions that is closest in proximity to the different region; and
   modifying the digital image by repositioning the textual content within the selected candidate placement region that is closest in proximity to the different region.

7. The method as described in claim 1, wherein the modifying the digital image further comprises automatically scaling the textual content to fit within the selected placement region.

8. The method as described in claim 7, wherein the scaling the textual content to fit within the placement region comprises at least one of:
   adjusting a font size of the textual content;
   adjusting a font type of the textual content;
   adjusting spacing between individual characters of the textual content; or
   aligning the textual content within the placement region.

9. The method as described in claim 1, wherein the placement region for the textual content is automatically determined without receiving additional user input to specify a size or position of the textual content within the digital image.

10. The method as described in claim 1, wherein the user input includes the textual content.

11. One or more computer-readable storage devices comprising instructions thereon that, responsive to execution by one or more processors, perform operations comprising:
    receiving user input to add textual content to a digital image;
    identifying multiple objects in the digital image using an image segmentation model;
    generating an object mask based on boundaries of the multiple objects in the digital image, the object mask identifying non-object portions corresponding to portions of the digital image which do not include one of the multiple objects;

determining multiple candidate placement regions which can be formed in the non-object portions within the digital image;

identifying one or more subjects of the textual content using a natural language processing model;

determining, for each of the multiple objects, classification labels of each respective object;

identifying a correlated object of the multiple objects by comparing the classification label of each respective object to the one or more subjects of the textual content;

automatically selecting a placement region for the textual content from the multiple candidate placement regions based at least in part on a proximity of the selected placement regions to the correlated object; and modifying the digital image by positioning the textual content within the selected placement region.

12. The one or more computer-readable storage devices as described in claim 11, wherein the automatically selecting the placement region for the textual content further comprises:

calculating a placement score for each of the multiple candidate placement regions; and selecting the placement region from the multiple candidate placement regions based on the placement region having a highest calculated placement score of the multiple candidate placement regions.

13. The one or more computer-readable storage devices as described in claim 12, wherein the placement scores are calculated for each of the multiple candidate placement regions based on a size of the respective candidate placement region.

14. The one or more computer-readable storage devices as described in claim 12, wherein the placement scores are calculated for each of the multiple candidate placement regions based on a rule of thirds.

15. The one or more computer-readable storage devices as described in claim 12, wherein the placement scores are calculated for each of the multiple candidate placement regions based on the proximity of the respective candidate placement region to the correlated object of the digital image.

16. The one or more computer-readable storage devices as described in claim 12, wherein the operations further comprise:

receiving additional user input to move the textual content from the placement region to a different region of the digital image;

selecting a candidate placement region of the multiple candidate placement regions that is closest in proximity to the different region; and modifying the digital image by repositioning the textual content within the selected candidate placement region that is closest in proximity to the different region.

17. The one or more computer-readable storage devices as described in claim 11, wherein the modifying the digital image further comprises automatically scaling the textual content to fit within the selected placement region.

18. A system comprising:

at least a memory and a processor to perform operations comprising:

receiving user input to add textual content to a digital image;

identifying multiple objects in the digital image using an image segmentation model;

generating an object mask based on boundaries of the multiple objects in the digital image, the object mask identifying non-object portions corresponding to portions of the digital image which do not include one of the multiple objects;

determining multiple candidate placement regions which can be formed in the non-object portions within the digital image;

identifying one or more subjects of the textual content using a natural language processing model;

determining, for each of the multiple objects, classification labels of each respective object;

identifying a correlated object of the multiple objects by comparing the classification label of each respective object to the one or more subjects of the textual content;

automatically selecting a placement region for the textual content from the multiple candidate placement regions based at least in part on a proximity of the selected placement regions to the correlated object; and modifying the digital image by positioning the textual content within the selected placement region.

19. The system as described in claim 18, wherein the user input includes the textual content.

20. The system as described in claim 18, wherein the placement region for the textual content is automatically determined without receiving additional user input to specify a size or position of the textual content within the digital image.

* * * * *